(12) United States Patent
Honnamaranahalli (10) Patent No.: US 11,685,544 B2
(45) Date of Patent: Jun. 27, 2023

(54) FUEL LINE AND EXPANDABLE FUEL LINE SECTION FOR AN AIRCRAFT AND METHOD FOR FABRICATING AN EXPANDABLE FUEL LINE SECTION

(71) Applicant: Gulfstream Aerospace Corporation, Savannah, GA (US)

(72) Inventor: Lingesha Honnamaranahalli, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 1254 days.

(21) Appl. No.: 16/197,879

(22) Filed: Nov. 21, 2018

(65) Prior Publication Data
US 2020/0156802 A1   May 21, 2020

(51) Int. Cl.
*B64D 37/00* (2006.01)
*F16L 39/04* (2006.01)

(52) U.S. Cl.
CPC ............ *B64D 37/005* (2013.01); *F16L 39/04* (2013.01)

(58) Field of Classification Search
CPC ................................ B64D 37/005; F16L 39/04
See application file for complete search history.

(56) References Cited

U.S. PATENT DOCUMENTS

| | | | | |
|---|---|---|---|---|
| 2,702,716 A | * | 2/1955 | Basolo | F16L 21/022 285/369 |
| 4,776,617 A | * | 10/1988 | Sato | F16L 27/1274 285/302 |
| 6,056,329 A | * | 5/2000 | Kitani | F16L 27/12 285/302 |
| 7,717,473 B1 | * | 5/2010 | Zhang | F16L 39/04 285/302 |
| 7,942,456 B2 | * | 5/2011 | Duggan | F16L 21/035 285/382 |
| 8,172,272 B2 | * | 5/2012 | Petit | F16L 39/005 285/302 |
| 8,480,133 B2 | * | 7/2013 | Zhang | F16L 27/026 285/302 |
| 8,567,825 B2 | * | 10/2013 | Canale | A47L 9/244 285/302 |
| 2010/0012786 A1 | * | 1/2010 | Zhang | F16L 27/125 244/135 C |
| 2011/0084481 A1 | * | 4/2011 | Peng | B63B 45/00 285/302 |
| 2012/0057267 A1 | * | 3/2012 | Petit | F16L 25/025 361/215 |

(Continued)

*Primary Examiner* — Craig M Schneider
*Assistant Examiner* — David R Deal
(74) *Attorney, Agent, or Firm* — LKGlobal | Lorenz & Kopf, LLP (57) ABSTRACT

An expandable fuel line section for an aircraft, a fuel line for an aircraft, and a method for fabricating an expandable fuel line section for an aircraft are provided. In one non-limiting example, the expandable fuel line section includes a first inner tube section subassembly. A second inner tube section subassembly is in fluid communication with the first inner tube section subassembly. An outer tube subassembly has an outer tube wall surrounding an outer tube channel. The first and second inner tube section subassemblies are slidingly disposed in the outer tube channel to move between retracted positions and extended positions.

18 Claims, 6 Drawing Sheets

(56) References Cited

U.S. PATENT DOCUMENTS

2012/0132755 A1* 5/2012 Petit .................. F16L 27/12
                                                                          29/592
2014/0116561 A1* 5/2014 Krall ................. F16L 39/04
                                                                          138/114
2016/0153597 A1   6/2016 Correa et al.

\* cited by examiner

FUEL LINE AND EXPANDABLE FUEL LINE SECTION FOR AN AIRCRAFT AND METHOD FOR FABRICATING AN EXPANDABLE FUEL LINE SECTION

TECHNICAL FIELD

The technical field relates generally to fuel lines for aircrafts, and more particularly, relates to expandable aircraft fuel line sections that include tube sections that can be telescopically moved out from retracted positions to expanded positions, fuel lines for aircrafts including such fuel line sections, and methods for fabricating such fuel line sections.

BACKGROUND

Aircrafts include fuel lines for transporting fuel from the aircraft's fuel tank(s) to its engine(s). Current airworthiness standards for fuel lines installed on transport category aircrafts include Federal Regulation 14 CFR § 25.993 (f), which requires that fuel lines within the fuselage be "designed and installed to allow a reasonable degree of deformation and stretching without leakage" in all foreseeable operating conditions, including a survivable crash environment.

One test that the Federal Aviation Administration (FAA) requires aircraft manufactures to conduct to demonstrate that the aircraft's fuel lines will satisfy Federal Regulation 14 CFR § 25.993 (0 is the guillotine test. In this test, a guillotine, which includes a ⅛ inch thick steel blade, is dropped from a height of 37.5 feet and guided to impact a fuel line. A 10 feet section of fuel line must deform at least 12 to 18 inches under the force of the guillotine without leaking any fuel to satisfy the various requirements of the guillotine test.

One approach aircraft manufacturers have evaluated for meeting the foregoing requirements are the use of stretchable flex fuel hoses (e.g., Buna-N/NBR per MIL-DTL-8794 fuel hoses) that are incorporated into the fuel line. Unfortunately, stretchable flex fuel hoses are relatively expensive and heavier than conventional metal fuel lines and further, have a useful life limitation that necessitates replacement of these flex hoses during the service life of the aircraft.

Another approach aircraft manufactures have evaluated is to add sufficient slack in the fuel line routing, for example in an "S-shaped" pattern or the like, which can straighten or otherwise move during impact to accommodate the required deflection. Unfortunately, package space within many aircraft's fuselages is relatively limited for accommodating any significant slack in the fuel line routing, often making this approach impractical.

Accordingly, it is desirable to provide improved aircraft fuel line sections that can deform or otherwise expand to meet airworthiness standards for fuel lines, fuel lines including such fuel line sections, and methods for fabricating such fuel line sections. Furthermore, other desirable features and characteristics of the various embodiments described herein will become apparent from the subsequent detailed description and the appended claims, taken in conjunction with the accompanying drawings and this background.

SUMMARY

Various non-limiting embodiments of expandable fuel line section for an aircraft, various non-limiting embodiments of a fuel line for an aircraft, and various non-limiting embodiments of a method for fabricating an expandable fuel line section for an aircraft, are provided herein.

In a first non-limiting embodiment, the expandable fuel line section includes, but is not limited to, a first inner tube section subassembly. The expandable fuel line section further includes, but is not limited to, a second inner tube section subassembly that is in fluid communication with the first inner tube section subassembly. The expandable fuel line section further includes, but is not limited to, an outer tube subassembly that has an outer tube wall surrounding an outer tube channel. The first and second inner tube section subassemblies are slidingly disposed in the outer tube channel to move between retracted positions and extended positions.

In another non-limiting embodiment, the fuel line includes, but is not limited to, a first fuel line section in fluid communication with a fuel tank. The fuel line further includes, it is not limited to, a second fuel line section that is in fluid communication with an engine. The fuel line includes, but is not limited to, an expandable fuel line section that is disposed between the first fuel line section and the second fuel line section. The expandable fuel line section includes, but is not limited to, a first inner tube section subassembly that is in fluid communication with the first fuel line section. The expandable fuel line section further includes, but is not limited to, a second inner tube section subassembly that is in fluid communication with both the first inner tube section subassembly and the second fuel line section. The expandable fuel line section further includes, but is not limited to, an outer tube subassembly having an outer tube wall surrounding an outer tube channel. The first and second inner tube section subassemblies are slidingly disposed in the outer tube channel to move between retracted positions and extended positions.

In another non-limiting embodiment, the method includes, but is not limited to, arranging a first inner tube section subassembly in an outer tube channel of an outer tube subassembly. The method further includes, but is not limited to, arranging a second inner tube section subassembly in the outer tube channel of the outer tube subassembly such that the second inner tube section subassembly is in fluid communication with the first inner tube section subassembly. The first and second inner tube section subassemblies are slidingly disposed in the outer tube channel to move between retracted positions and extended positions.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to expandable fuel line sections for aircrafts, fuel lines including expandable fuel line sections, and methods for fabricating expandable fuel line sections. The exemplary embodiments taught herein provide a fuel line that includes an expandable fuel line section. The expandable fuel line section includes a first inner tube section subassembly. A second inner tube section subassembly is in fluid communication with the first inner tube section subassembly. An outer tube subassembly has an outer tube wall surrounding an outer tube channel. The first and second inner tube section subassemblies are slidingly disposed in the outer tube channel to move between retracted positions and extended positions.

In an exemplary embodiment, advantageously the expandable fuel line section may be efficiently packaged within the structure of an aircraft with the first and second inner tube section subassemblies in the fully or partially retracted positions. Further, in an exemplary embodiment, advantageously the expandable fuel line section including the first and second inner tube section subassemblies and the outer tube subassembly may be formed of sections of metal tubing that inherently have a long useful life, thereby minimizing or preventing the need to replace the expandable fuel line section during the service life of the aircraft. Additionally, in an exemplary embodiment, when the expandable fuel line section is impacted, for example by a guillotine in a guillotine test or otherwise, the first and second inner tube section subassemblies can move from the fully or partially retracted positions towards the extended positions, thereby increasing the total length of the expandable fuel line section to provide a reasonable degree of additional length and/or deflection without fuel leakage.

Figure 1:
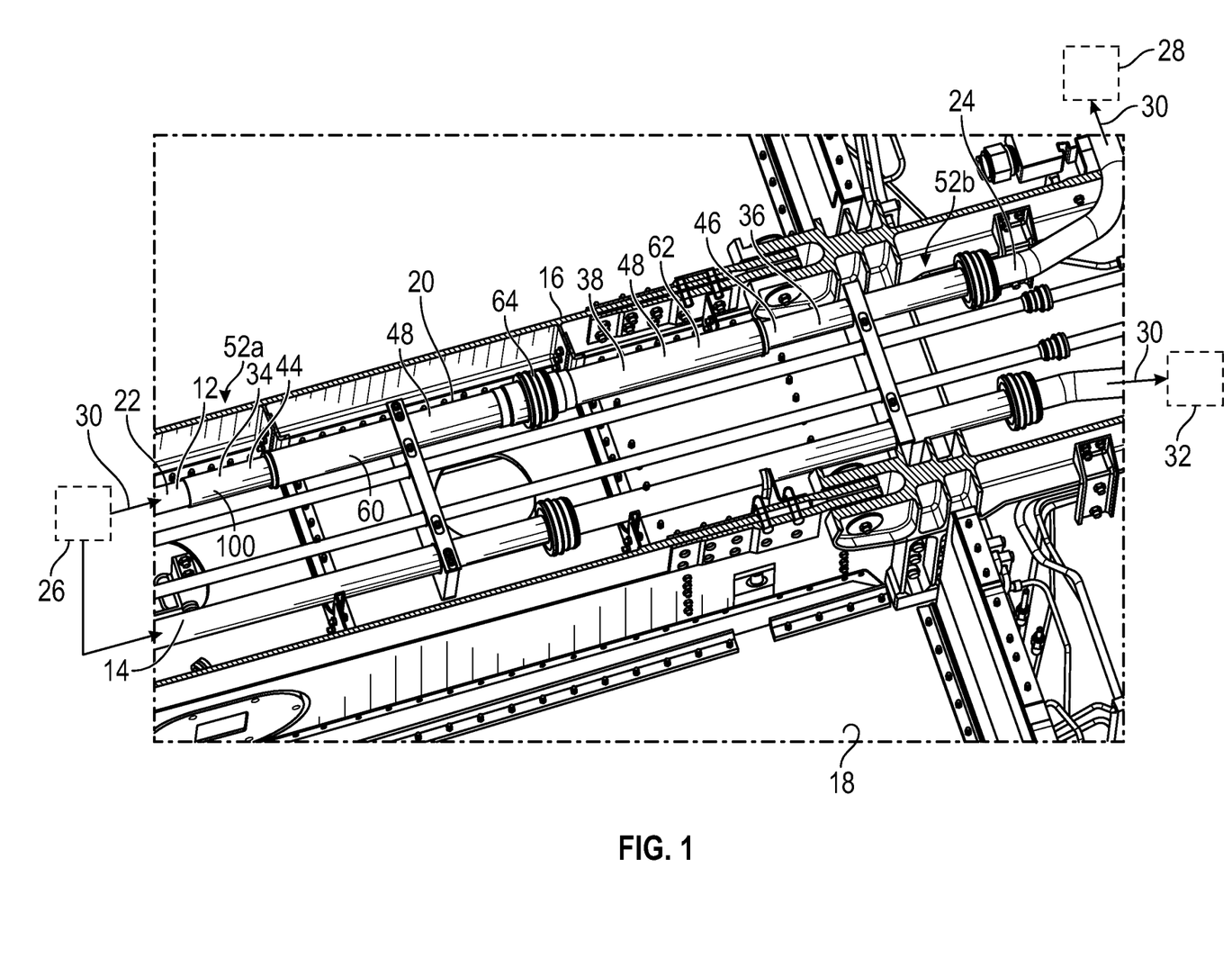
FIG. 1 is a perspective view illustrating a fuel line including an expandable fuel line section in a structure of an aircraft in accordance with an exemplary embodiment.
Figure 2:
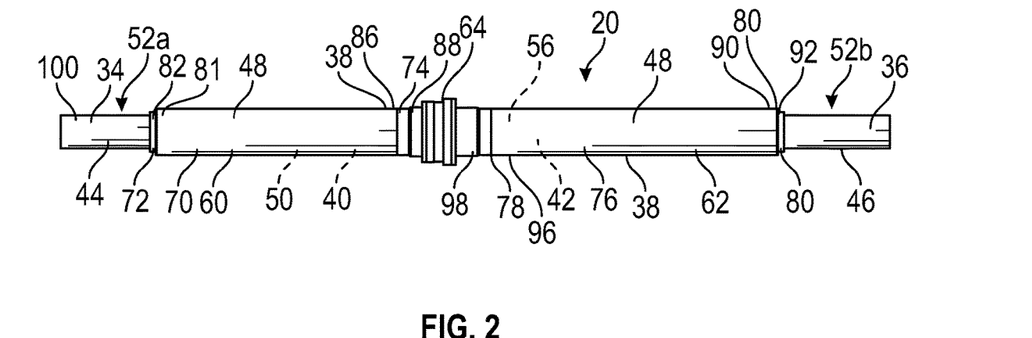
FIG. 2 is a side view illustrating an expandable fuel line section in accordance with an exemplary embodiment.
Figure 3:
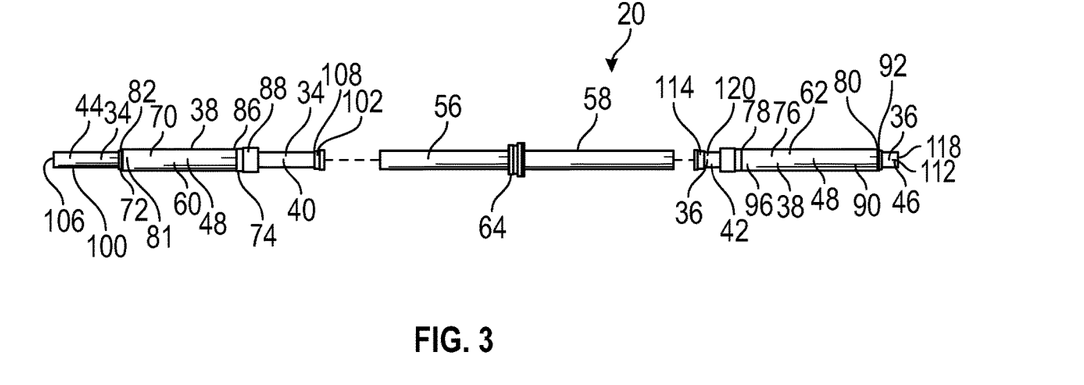
FIG. 3 is an exploded side view illustrating an expandable fuel line section in accordance with an exemplary embodiment.
Figure 4:
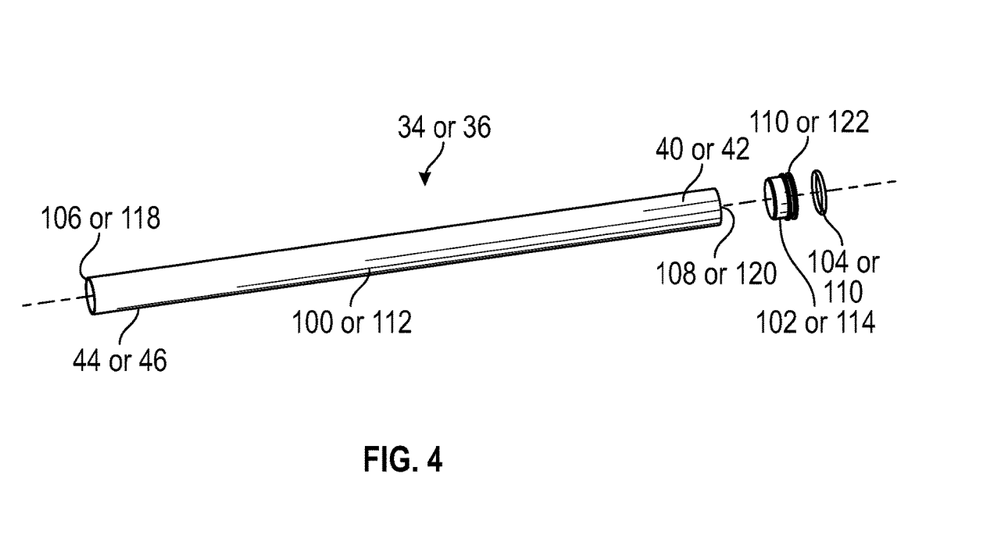
FIG. 4 is an exploded perspective view illustrating an inner tube section subassembly of an expandable fuel line section in accordance with an exemplary embodiment.
Figure 5:
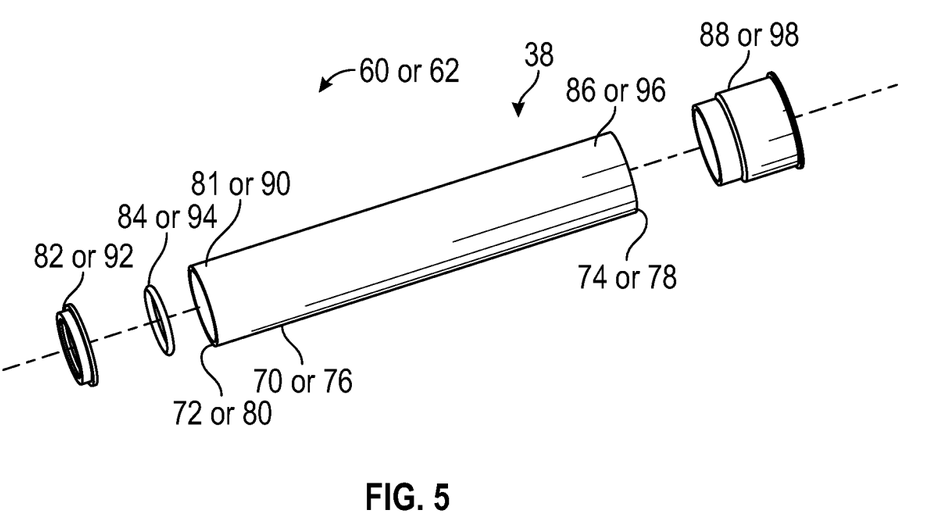
FIG. 5 is an exploded perspective view illustrating an outer tube section subassembly of an expandable fuel line section in accordance with an exemplary embodiment.
Figure 6:
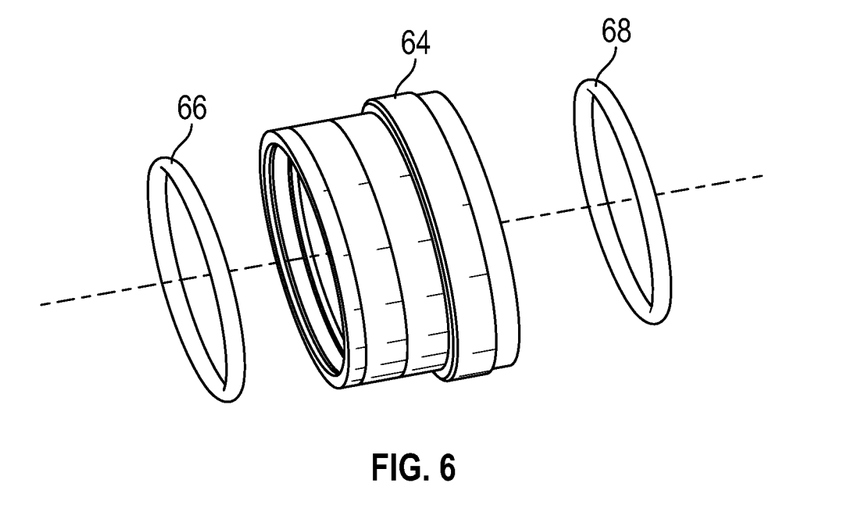
FIG. 6 is an exploded perspective view illustrating a coupling of an expandable fuel line section in accordance with an exemplary embodiment.
Figure 7:
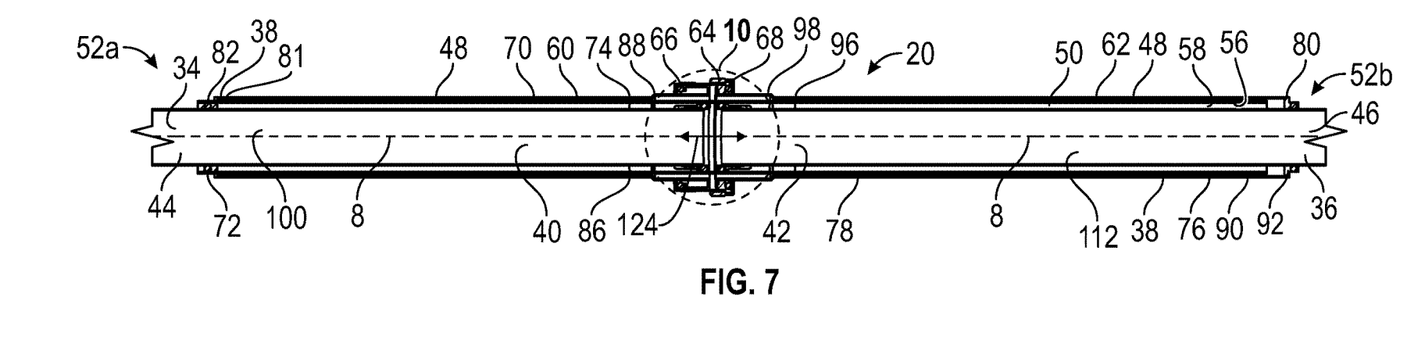
FIG. 7 is a tear-away side view illustrating an expandable fuel line section in a fully retracted condition in accordance with an exemplary embodiment.
Figure 8:
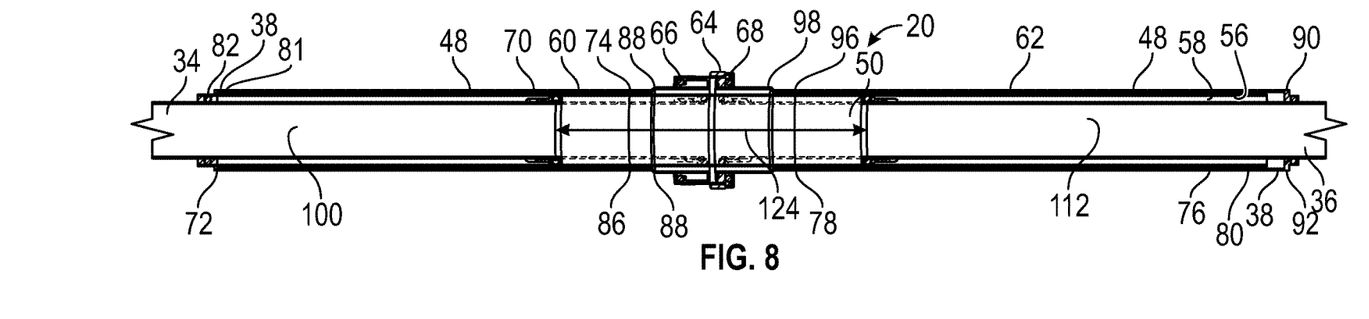
FIG. 8 is a tear-away side view illustrating an expandable fuel line section in a partially extended condition in accordance with an exemplary embodiment.

FIG. 1 is a perspective view illustrating fuel lines 12 and 14 in a torque box area of a fuselage structure 16 of an aircraft 18 in accordance with an exemplary embodiment. The fuel line 12 includes an expandable fuel line section 20 that is disposed between and coupled to fuel line sections 22 and 24 of the fuel line 12. As illustrated, the fuel line 14 is a conventional fuel line formed of sections of metal conduit and couplings that are efficiently packaged within the fuselage structure 16. Similarly, in an exemplary embodiment and as will be discussed in further detail below, the expandable fuel line section 20, which can be further extended in length, is fully or partially retracted so that the fuel line 12 is efficiently packaged within the fuselage structure 16.

The fuel line section 22 is in fluid communication with a fuel tank 26 and the fuel line section 24 is in fluid communication with an engine 28. The expandable fuel line section 20 is in fluid communication with the fuel line sections 22 and 24 so that fuel 30 can be transported through the fuel line 12 from the fuel tank 26 to the engine 28. Likewise, the fuel line 14 is in fluid communication with the fuel tank 26 and an engine 32 so that fuel 30 can be transported from the fuel tank 26 to the engine 32.

Referring to FIGS. 1-3 and FIG. 7, the expandable fuel line section 20 includes inner tube section subassemblies 34 and 36. The inner tube section subassembly 34 is coupled to (e.g., via welding or the like) and in fluid communication with the fuel line section 22. Likewise, the inner tube section subassembly 36 is coupled to (e.g., via welding or the like) and in fluid communication with the fuel line section 24.

In an exemplary embodiment, the expandable fuel line section 20 further includes an outer tube subassembly 38 that surrounds proximal portions 40 and 42 of the inner tube section subassemblies 34 and 36 while distal portions 44 and 46 of the inner tube section subassemblies 34 and 36 extend outside of the outer tube subassembly 38. As illustrated, the outer tube subassembly 38 has an outer tube wall 48 that surrounds an outer tube channel 50. As will be discussed in further detail below, the inner tube section subassemblies 34 and 36 are slidingly disposed in the outer tube channel 50 to telescopically move, independently of each other (e.g., in a unidirectional or bidirectional mode), between retracted positions 52*a* and 52*b* and extended positions 54*a* and 54*b* (shown in FIG. 9).

In an exemplary embodiment, a sleeve 56 is disposed in the outer tube channel 50 surrounded by the outer tube wall 48. The sleeve 56 is configured as a relatively straight tube or conduit having a sleeve wall 58 that surrounds the adjacent proximal portions 40 and 42 of the inner tube section subassemblies 34 and 36. In an exemplary embodiment and as illustrated, the sleeve 56 is concentrically disposed between the outer tube subassembly 38 and the proximal portions 40 and 42 of the inner tube section subassemblies 34 and 36, wherein the outer tube subassembly 38, the inner tube section subassemblies 34 and 36, and the sleeve 56 share a central longitudinal axis 8.

Referring to FIGS. 1-3, 5-7, and 10, the outer tube subassembly 38 includes outer tube section subassemblies 60 and 62. The outer tube section subassemblies 60 and 62 are coupled together via a coupling 64 (e.g., collar type or ring-shaped coupling or the like). Sealing elements 66 and 68, e.g., O-rings or the like, are disposed between the coupling 64 and the outer tube section subassemblies 60 and 62, respectively.

In an exemplary embodiment, the outer tube section subassembly 60 includes an outer tube section 70 that forms a first section of the outer tube wall 48. As illustrated, the outer tube section 70 is configured as a relatively straight tube or conduit having outer tube open ends 72 and 74 that are opposite of each other. On the distal portion 81 of the outer tube section 70 is an outer tube end fitting 82 that is coupled to the outer tube open end 72. As will be discussed in further detail below, an outer tube sealing element 84 sealingly interfacing with the outer tube end fitting 82. On the proximal portion 86 of the outer tube section 70 is an outer tube ferrule 88 (e.g., ring or collar shaped element or the like for fastening and/or joining) that is coupled to the outer tube open end 74.

Likewise, the outer tube section subassembly 62 includes an outer tube section 76 that forms a second section of the outer tube wall 48. As illustrated, the outer tube section 76 is configured as a relatively straight tube or conduit having outer tube open ends 78 and 80 that are opposite of each other. On the distal portion 90 of the outer tube section 76 is an outer tube end fitting 92 that is coupled to the outer tube open end 80. As will be discussed in further detail below, an outer tube sealing element 94 sealingly interfacing with the outer tube end fitting 92. On the proximal portion 96 of the outer tube section 76 is an outer tube ferrule 98 that is coupled to the outer tube open end 78.

Figure 10:
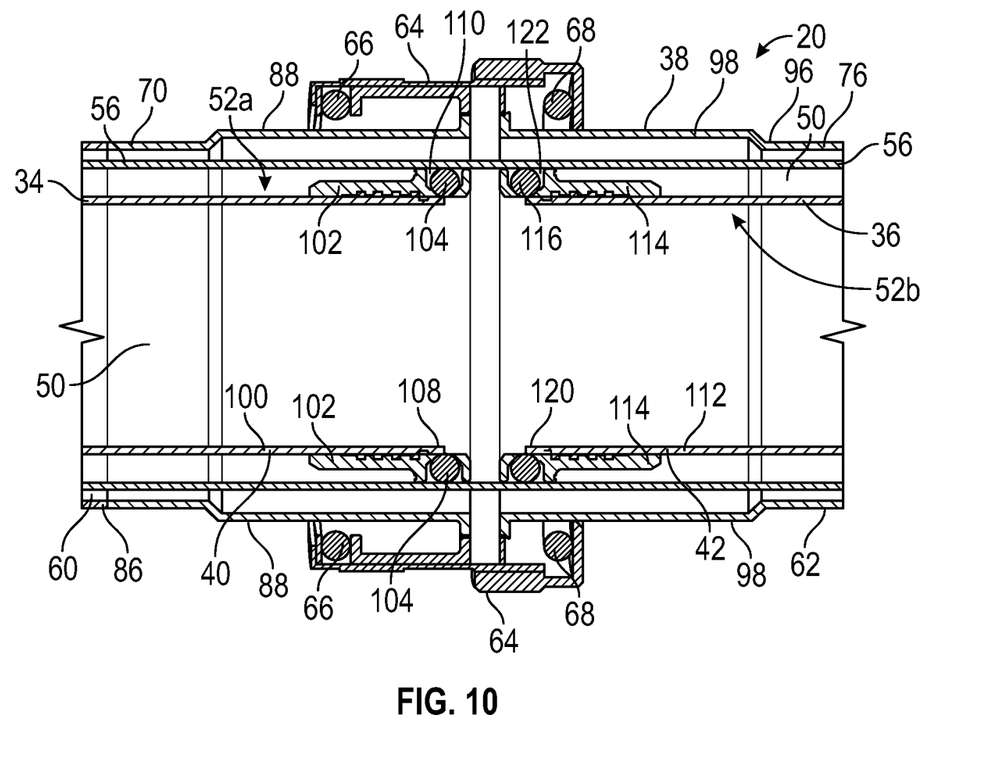
FIG. 10 is an enlarged view illustrating an encircled portion 10 of the expandable fuel line section depicted in FIG. 7.

Referring to FIG. 10, as discussed above, the coupling 64 is disposed about and couples the adjacent proximal portions 86 and 96 of the outer tube section subassemblies 60 and 62 together so that they are axially aligned. The sealing elements 66 and 68 are sandwiched between and sealingly interface with the coupling 64 and the outer surfaces of the outer tube ferrules 88 and 98, respectively, to form a fuel tight seal where the outer tube section subassemblies 60 and 62 are joined.

Referring to FIGS. 1-4, 7 and 10, the inner tube section subassembly 34 includes an inner tube section 100, an inner tube ferrule 102, and a sealing element 104, e.g., O-ring or the like. As illustrated, the inner tube section 100 is configured as a relatively straight tube or conduit having inner tube open ends 106 and 108 that are opposite of each other. On the proximal portion 40 of the inner tube section 100 is the inner tube ferrule 102 that is coupled to the inner tube open end 108. The sealing element 104 is disposed about and sealingly interfaces the inner tube ferrule 102 and the inner surface of the sleeve 56 to form a fuel tight seal. In an exemplary embodiment, the inner tube ferrule 102 has a groove 110 and the sealing element 104 is disposed in the groove 110 to retain the sealing element 104 on the inner tube ferrule 102 and against the inner surface of the sleeve 56 during movement of the inner tube section subassembly 34. The inner tube open end 106 at the distal portion 44 of the inner tube section 100 is coupled to and in fluid communication with the fuel line section 22.

Likewise, the inner tube section subassembly 36 includes an inner tube section 112, an inner tube ferrule 114, and a sealing element 116, e.g., O-ring or the like. As illustrated, the inner tube section 112 is configured as a relatively straight tube or conduit having inner tube open ends 118 and 120 that are opposite of each other. On the proximal portion 42 of the inner tube section 112 is the inner tube ferrule 114 that is coupled to the inner tube open end 120. The sealing element 116 is disposed about and sealingly interfaces the inner tube ferrule 114 and the inner surface of the sleeve 56 to form a fuel tight seal. In an exemplary embodiment, the inner tube ferrule 114 has a groove 122 and the sealing element 116 is disposed in the groove 122 to retain the sealing element 116 on the inner tube ferrule 114 and against the inner surface of the sleeve 56 during movement of the inner tube section subassembly 36. The inner tube open end 118 at the distal portion 46 of the inner tube section 112 is coupled to and in fluid communication with the fuel line section 24.

Referring to FIGS. 7-10, as discussed above, when the inner tube section subassemblies 34 and 36 are in the retracted positions 52a and 52b, for example as installed in the fuselage structure 16 of the aircraft 18, the proximal portions 40 and 42 are disposed within the outer tube channel 50 and the inner tube section subassemblies 34 and 36 extend correspondingly through the outer tube open ends 72 and 80 to position the distal portions 44 and 46 outside of the outer tube subassembly 38. In an exemplary embodiment, when the expandable fuel line section 20 is impacted, for example during a guillotine test or the like, the inner tube section subassemblies 34 and 36 move in opposite directions (designated by double headed arrow 124) from the retracted positions 52a and 52b towards the extended positions 54a and 54b in response to the impact force. In an exemplary embodiment, the inner tube section subassemblies 34 and 36 are configured to move independently of each other, e.g., in a unidirectional or bidirectional mode, in the opposite directions 124 from the retracted positions 52a and 52b towards the extended positions 54a and 54b. For example, one of the inner tube section subassemblies 34 and 36 can move distally outward while the other of the inner tube section subassemblies 34 and 36 does not substantially move, thereby defining a unidirectional mode. Alternatively, both of the inner tube section subassembly 34 and 36 can move distally outward, e.g., at different rates, substantially the same rate, different distances, or substantially the same distances, thereby defining a bidirectional mode.

In an exemplary embodiment, as the inner tube section subassemblies 34 and 36 move in the opposite directions 124, the intermediate portions of the inner tube section subassemblies 34 and 36 advanced through the outer tube channel 50 and exit the outer tube open ends 72 and 80 to the extended positions 54a and 54b, thereby increasing the total length of the expandable fuel line section 20. In an exemplary embodiment, a fuel leak-free fluid path is continuously provided between the inner tube section subassemblies 34 and 36 during movement from the retracted positions 52a and 52b to the extended positions 54a and 54b by the sleeve 56 and the sealing elements 104 and 116 that sealingly interface with the sleeve 56 and the inner tube ferrules 102 and 114 of the inner tube section subassemblies 34 and 36.

Figure 9:
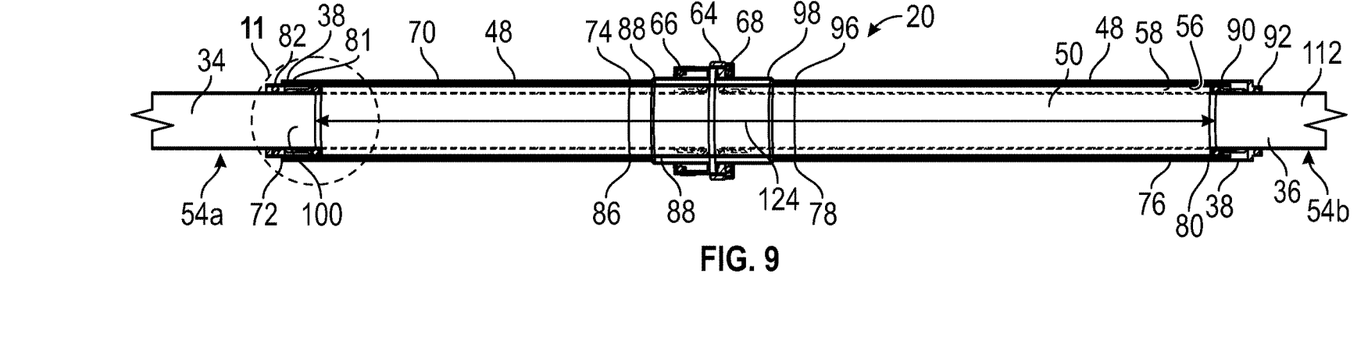
FIG. 9 is a tear-away side view illustrating an expandable fuel line section in a fully extended condition in accordance with an exemplary embodiment.
Figure 11:
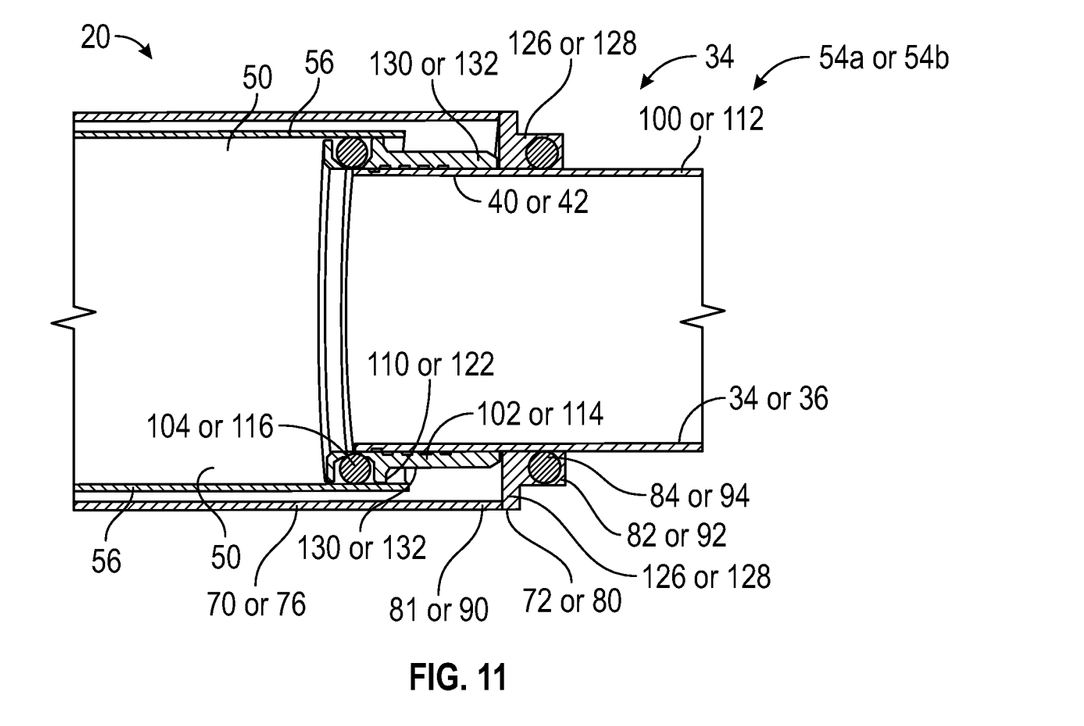
FIG. 11 is an enlarged view illustrating an encircled portion 11 of the expandable fuel line section depicted in FIG. 9.

As illustrated in FIGS. 9 and 11, when the inner tube section subassemblies 34 and 36 are in the fully extended positions 54a and 54b, the proximal ends of the proximal portions 40 and 42 are disposed within the outer tube channel 50, while all or substantially all of the remaining portions of the inner tube section subassemblies 34 and 36 are positioned outside of the outer tube subassembly 38.

In an exemplary embodiment, the outer tube end fittings 82 and 92 of the outer tube sections 70 and 76 correspondingly include collars 126 and 128, and the inner tube ferrules 102 and 114 of the inner tube section subassemblies 34 and 36 correspondingly include shoulders 130 and 132. As illustrated, the shoulders 130 and 132 correspondingly abut the collars 126 and 128 when the inner tube section subassemblies 34 and 36 are in the extended positions 54a and 54b to limit further outward movement of the inner tube section subassemblies 34 and 36.

Referring to FIGS. 1-11, in an exemplary embodiment, the flexible fuel line section 20 can be constructed to be built to whatever length as per deflection required for the aircraft, subject to surrounding packaging constraints. In an exemplary embodiment, the expandable fuel line section 20 has a retracted total length defined by a distance between the inner tube open ends 106 and 118 when the inner tube section subassemblies 34 and 36 are in the retracted positions 52a and 52b, and an expanded total length defined by a distance between the inner tube open ends 106 and 118 when the inner tube section subassemblies 34 and 36 are in the extended positions 54a and 54b. In an exemplary embodiment, the expandable fuel line section 20 has an expandable length per 10 feet of expandable fuel line section 20 of from about 1 foot to about 2 feet, where the expandable length per 10 feet of expandable fuel line section 20 is defined by: (10 feet)×(the expanded total length−the retracted total length)/(the retracted total length).

Figure 12:
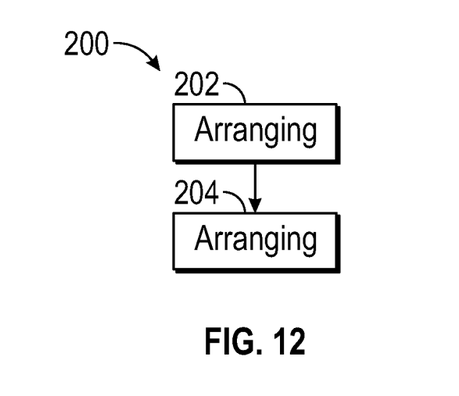
FIG. 12 is a schematic representation illustrating a method for fabricating an expandable fuel line section for an aircraft in accordance with an exemplary embodiment.

Referring to FIG. 12, a method 200 for fabricating an expandable fuel line section for an aircraft in accordance with an exemplary embodiment is provided. The method includes, at step 202, arranging a first inner tube section subassembly in an outer tube channel of an outer tube subassembly. At step 204, a second inner tube section subassembly is arranged in the outer tube channel of the outer tube subassembly such that the second inner tube section subassembly is in fluid communication with the first inner tube section subassembly. The first and second inner tube section subassemblies are slidingly disposed in the outer tube channel to move between retracted positions and extended positions.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An expandable fuel line section for an aircraft, comprising:
    a first inner tube section subassembly;
    a second inner tube section subassembly in fluid communication with the first inner tube section subassembly; and
    an outer tube subassembly having an outer tube wall surrounding an outer tube channel, wherein the first and second inner tube section subassemblies are slidingly disposed in the outer tube channel to move between retracted positions and extended positions,
    wherein the outer tube subassembly includes:
    a first outer tube section subassembly;
    a second outer tube section subassembly; and
    a coupling that couples the first and second outer tube section subassemblies together, and
    wherein the first outer tube section subassembly includes:
    a first outer tube section forming a first section of the outer tube wall and having a first outer tube open end and a second outer tube open end opposite the first outer tube open end;
    a first outer tube end fitting coupled to the first outer tube open end;
    a first outer tube sealing element sealingly interfacing with the first outer tube end fitting; and
    a first outer tube ferrule coupled to the second outer tube open end, and wherein the second outer tube section subassembly includes:
    a second outer tube section forming a second section of the outer tube wall and having a third outer tube open end and a fourth outer tube open end opposite the third outer tube open end;
    a second outer tube end fitting coupled to the fourth outer tube open end;
    a second outer tube sealing element sealingly interfacing with the second outer tube end fitting; and
    a second outer tube ferrule coupled to the third outer tube open end, and wherein the coupling is coupled to the first and second outer tube ferrules.

2. The expandable fuel line section of claim 1, wherein the first and second inner tube section assemblies are configured to move independently of each other between the retracted positions and the extended positions.

3. The expandable fuel line section of claim 1, wherein the first and second inner tube section assemblies are configured to move in opposite directions from the retracted positions to the extended positions.

4. The expandable fuel line section of claim 1, wherein the outer tube subassembly further includes:
    a first sealing element that is disposed between the coupling and the first outer tube section subassembly; and
    a second sealing element that is disposed between the coupling and the second outer tube section subassembly.

5. The expandable fuel line section of claim 1, wherein the first outer tube sealing element and the second outer tube sealing element sealingly interface with a first outer surface of the first inner tube section subassembly and a second outer surface of the second inner tube section subassembly, respectively.

6. The expandable fuel line section of claim 1, wherein the first inner tube section subassembly includes:
    a first inner tube section has a first inner tube open end and a second inner tube open end opposite the first inner tube open end;
    a first inner tube ferrule coupled to the second inner tube open end; and
    a first sealing element sealingly interfacing with the first inner tube ferrule, and wherein the second inner tube section subassembly includes:
    a second inner tube section having a third inner tube open end and a fourth inner tube open end opposite the third inner tube open end;
    a second inner tube ferrule coupled to the third inner tube open end; and
    a second sealing element sealingly interfacing with the second inner tube ferrule.

7. The expandable fuel line section of claim 6, wherein a first portion of the first inner tube section is disposed within the outer tube channel surrounded by the first outer tube section and extends through the first outer tube open end to position the first inner tube open end outside of the first outer tube section subassembly.

8. The expandable fuel line section of claim 7, wherein a second portion of the second inner tube section is disposed within the outer tube channel surrounded by the second outer tube section and extends through the fourth outer tube open end to position the fourth inner tube open end outside of the second outer tube section subassembly.

9. The expandable fuel line section of claim 6, further comprising a sleeve disposed in the outer tube channel surrounded by the outer tube wall and having a sleeve wall that surrounds adjacent portions of the first and second inner tube section subassemblies.

10. The expandable fuel line section of claim 9, wherein the first sealing element of the first inner tube section subassembly and the second sealing element of the second inner tube section subassembly sealingly interface with an inner surface of the sleeve.

11. The expandable fuel line section of claim 6, wherein the first outer tube end fitting includes a first collar and the second outer tube end fitting includes a second collar, and wherein the first inner tube ferrule has a first shoulder and the second inner tube ferrule has a second shoulder, and wherein the first shoulder abuts the first collar and the second shoulder abuts the second collar when the first and second inner tube section subassemblies are in the extended positions.

12. A fuel line for an aircraft, comprising:
a first fuel line section in fluid communication with a fuel tank;
a second fuel line section in fluid communication with an engine; and
an expandable fuel line section disposed between the first fuel line section and the second fuel line section, wherein the expandable fuel line section includes:
a first inner tube section subassembly in fluid communication with the first fuel line section;
a second inner tube section subassembly in fluid communication with both the first inner tube section subassembly and the second fuel line section; and
an outer tube subassembly having an outer tube wall surrounding an outer tube channel, wherein the first and second inner tube section subassemblies are slidingly disposed in the outer tube channel to move between retracted positions and extended positions,
wherein the outer tube subassembly includes:
a first outer tube section subassembly;
a second outer tube section subassembly; and
a coupling that couples the first and second outer tube section subassemblies together, and
wherein the first outer tube section subassembly includes:
a first outer tube section forming a first section of the outer tube wall and having a first outer tube open end and a second outer tube open end opposite the first outer tube open end;
a first outer tube end fitting coupled to the first outer tube open end;
a first outer tube sealing element sealingly interfacing with the first outer tube end fitting; and
a first outer tube ferrule coupled to the second outer tube open end, and wherein the second outer tube section subassembly includes:
a second outer tube section forming a second section of the outer tube wall and having a third outer tube open end and a fourth outer tube open end opposite the third outer tube open end;
a second outer tube end fitting coupled to the fourth outer tube open end;
a second outer tube sealing element sealingly interfacing with the second outer tube end fitting; and
a second outer tube ferrule coupled to the third outer tube open end, and wherein the coupling is coupled to the first and second outer tube ferrules.

13. The fuel line of claim 12, wherein the first inner tube section subassembly has a first inner tube open end that is coupled to the first fuel line section and a second inner tube open end opposite the first inner tube open end, and wherein the second inner tube section subassembly has a third inner tube open end that is adjacent to the second inner tube open end and a fourth inner tube open end that is opposite the third inner tube open end and that is coupled to the second fuel line section.

14. The fuel line of claim 13, wherein the outer tube subassembly has a first outer tube open end and a second outer tube open end opposite the first outer tube open end, and wherein a first portion of the first inner tube section subassembly is disposed within the outer tube channel and extends through the first outer tube open end, and wherein a second portion of the second inner tube section subassembly is disposed within the outer tube channel and extends through the second outer tube open end.

15. The fuel line of claim 14, wherein the expandable fuel line section is configured such that at least a first part of the first portion of the first inner tube section subassembly is advanced through the outer tube channel through the first outer tube open end and at least a second part of the second portion of the second inner tube section subassembly is advanced through the outer tube channel through the second outer tube open end when the first and second inner tube section subassemblies move from the retracted positions to the extended positions.

16. The fuel line of claim 13, wherein the expandable fuel line section has a retracted total length defined by a first distance between the first inner tube open end and the fourth inner tube open end when the first and second inner tube section subassemblies are in the retracted positions, and an expanded total length defined by a second distance between the first inner tube open end and the fourth inner tube open end when the first and second inner tube section assemblies are in the extended positions.

17. The fuel line of claim 16, wherein the expandable fuel line section has an expandable length per 10 feet of expandable fuel line section of from about 1 to about 2 feet, wherein the expandable length per 10 feet of expandable fuel line section is defined by: (10 feet)×(the expanded total length−the retracted total length)/(the retracted total length).

18. A method for fabricating an expandable fuel line section for an aircraft, the method comprising the steps of:
arranging a first inner tube section subassembly in an outer tube channel of an outer tube subassembly; and
arranging a second inner tube section subassembly in the outer tube channel of the outer tube subassembly such that the second inner tube section subassembly is in fluid communication with the first inner tube section subassembly, wherein the first and second inner tube section subassemblies are slidingly disposed in the outer tube channel to move between retracted positions and extended positions,
wherein the outer tube subassembly includes:
a first outer tube section subassembly;
a second outer tube section subassembly; and
a coupling that couples the first and second outer tube section subassemblies together, and
wherein the first outer tube section subassembly includes:
a first outer tube section forming a first section of the outer tube wall and having a first outer tube open end and a second outer tube open end opposite the first outer tube open end;
a first outer tube end fitting coupled to the first outer tube open end;
a first outer tube sealing element sealingly interfacing with the first outer tube end fitting; and
a first outer tube ferrule coupled to the second outer tube open end, and wherein the second outer tube section subassembly includes:

a second outer tube section forming a second section of the outer tube wall and having a third outer tube open end and a fourth outer tube open end opposite the third outer tube open end;
a second outer tube end fitting coupled to the fourth outer tube open end;
a second outer tube sealing element sealingly interfacing with the second outer tube end fitting; and
a second outer tube ferrule coupled to the third outer tube open end, and wherein the coupling is coupled to the first and second outer tube ferrules.

\* \* \* \* \*